Sept. 2, 1969  B. L. BISHOP  3,464,749
FOLD-AWAY KITCHEN APPLIANCE SUPPORT
Filed Nov. 3, 1967  2 Sheets-Sheet 1

BRUCE L. BISHOP, INVENTOR.

BY Joseph G. Warner
John M. Winter
ATTORNEYS

Sept. 2, 1969  B. L. BISHOP  3,464,749
FOLD-AWAY KITCHEN APPLIANCE SUPPORT
Filed Nov. 3, 1967  2 Sheets-Sheet 2

BRUCE L. BISHOP, INVENTOR.

BY Joseph G. Werner
John W. Winter
ATTORNEYS

United States Patent Office 3,464,749
Patented Sept. 2, 1969

3,464,749
FOLD-AWAY KITCHEN APPLIANCE SUPPORT
Bruce L. Bishop, 1501 Main St.,
Cross Plains, Wis. 53528
Filed Nov. 3, 1967, Ser. No. 680,378
Int. Cl. A47b 46/00, 67/02; H05k 5/02
U.S. Cl. 312—248                           4 Claims

ABSTRACT OF THE DISCLOSURE

A fold-away kitchen appliance support having a rectangular frame mounted in an opening in the bottom of a kitchen cupboard. A panel is hingedly connected at the rear of the frame for swinging movement between a horizontal closed positioned wherein it extends across the opening in the bottom of the cupboard and a vertical open position below the opening. The panel has a shelf, arms, or the like thereon for supporting an appliance in working position below the cupboard when the panel is open.

BACKGROUND OF THE INVENTION

Field of the invention

This invention pertains generally to kitchen appliance supports, and more particularly to fold-away supports for alternately storing a kitchen appliance in a cupboard and suspending the appliance in working position below the cupboard for use.

Description of the prior art

The use from time to time of a vast array of appliances such as toasters, coffee pots, grills, frying pans, can openers, blenders, waffle irons, juice squeezers, and mixers is not at all uncommon in the modern kitchen. With the advent of these many electric appliances which are designated for use on the kitchen counter top workspace for the housewife has become a real problem in the kitchen.

In view of this space problem, in recent years various schemes have been developed for alleviating the clutter by removing appliances from the kitchen counter top. For example, new toasters have been designed which are adapted to be mounted in the kitchen wall or some vertical panel in another larger appliance such as a stove from which it is then tilted out for use. As shown in U.S. Patent 3,230,862, toasters have been designed for mounting in a well in the kitchen counter top and covered when not in use. U.S. Patent 2,551,305 shows a specially designed cabinet and appliances wherein the appliances can be tilted up off the counter top and under the cabinet when not in use.

These developments all require a specially designed appliance and are quite complex and expensive. In most instances, the appliance becomes a fixture that can't be used at any other location that where it is installed.

SUMMARY OF THE INVENTION

My invention comprises a unit which is designed to be folded away into the bottom of a kitchen cupboard for holding various kitchen appliances, such as for example, electric toasters, can openers, knife racks, spice racks, paper toweling and the like. My unit can be easily installed in just a few minutes in the bottom of a conventional kitchen cupboard by merely cutting a rectangular opening in the bottom wall of the cupboard and securing the frame of the unit in place with several screws. The unit utilizes the cupboard space for storing the appliance and the unit is completely out of view except for the small handle which extends downwardly from the bottom of the cupboard for opening the unit. Conventional appliances can be used with the unit and the appliances can be removed therefrom when the housewife desires to use them at some other location.

DESCRIPTION OF THE PREFERRED EMBODIMENTS

Figure 1:
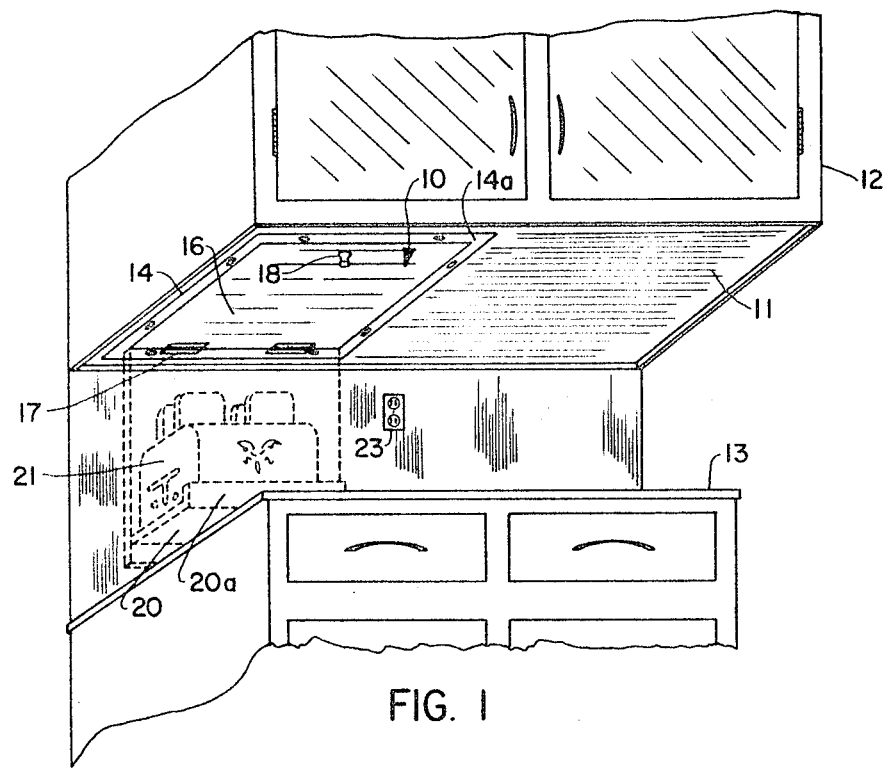
FIGURE 1 is a perspective view of my device installed in the bottom of a kitchen cupboard, the device being shown in closed position in full lines and in open position in dashed lines with a toaster supported thereon.
Figure 2:
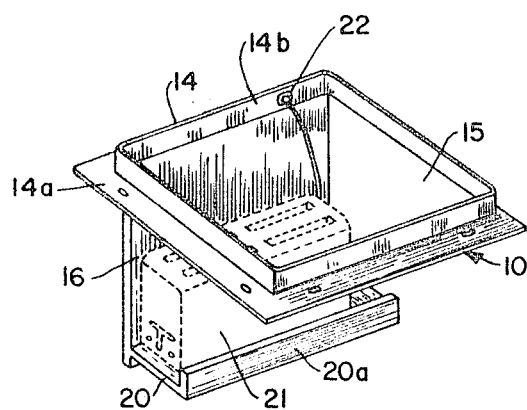
FIGURE 2 is a perspective view of my device removed from a cupboard with a toaster shown therein in dashed lines.
Figure 3:
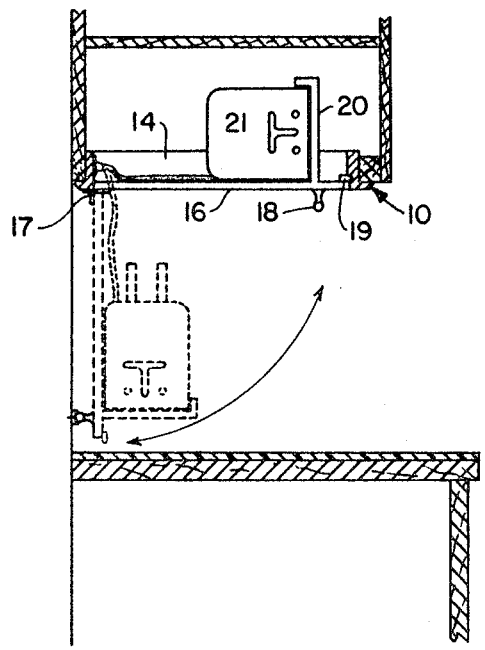
FIGURE 3 is a side elevation view, partly in section, showing my device in closed position in a cupboard in full lines and in open position in dashed lines.

Referring now more particularly to the drawings wherein like numerals refer to like parts throughout the several views my fold-away kitchen appliance support is generally shown at 10 in FIGURES 1–3 installed in the bottom wall 11 of a conventional kitchen cupboard 12 above the counter top 13.

My fold-away appliance support 10 comprises a substantially rectangular metal frame 14 which is inserted into a rectangular hole which is cut through the bottom wall of the cupboard. The frame 14 is secured to the bottom wall of the cupboard by a plurality of screws extending through the flange 14a of the frame. The frame may be made of steel, aluminum or any other suitable substantially rigid material.

The frame 14 defines a rectangular opening 15 corresponding with the hole cut in the bottom panel of the cupboard. As best seen in FIGURES 1 and 3, a substantially flat, rectangular door or panel 16 is hingedly connected to the rear side of the frame by hinges 17 so the panel can be swung between a substantially horizontal closed position extending across the opening 15, as shown in full lines, and a substantially vertical open position below the opening as shown in dashed lines. A small handle or knob 18 is provided near the front edge of the panel 16 for opening same. As best seen in FIGURE 3, a suitable latch 19 is provided for releasably holding the panel in its upper closed position.

The opening handle or knob 18 should be of such a size and the frame 14 should be so positioned in the bottom of the cupboard that the knob engages the wall on which the cupboard is mounted when the panel 16 has been swung downwardly into its vertical position. The knob will thus hold the panel in substantially vertical alignment and prevent swinging beyond the vertical.

As shown in FIGURES 1–3, a rigid shelf 20 may be formed integral with or attached to the panel 16 in perpendicular relation to form a supporting shelf for the kitchen appliance such as the toaster 21 illustrated in FIGURES 1–3. Preferably, the front edge of the shelf 20 has an upwardly protruding flange 20a for preventing the toaster or other appliance from sliding off the front end of the shelf during raising and lowering. Since in the preferred form, the panel 16 completely closes the opening 15 defined by the frame 14 of the unit, the shelf 20 is positioned slightly above the edge of the panel as shown in FIGURES 1–3, so that it will clear the front side of the frame when the panel is swung into closed position.

While the toaster or other appliance may be secured to the shelf by screws or some other means of attachment if desired, it is not necessary that the appliance be secured to the shelf.

As shown in FIGURE 2, a socket 22 for the electric plug of the appliance may be provided in the upwardly extending rear wall 14b of the frame member. In this way the appliance may be left plugged-in at all times. Alternatively, the electric cord for the appliance may merely be placed on the shelf and when the appliance is lowered into its working position. The appliance can then be plugged into a wall socket such as shown under the cupboard at 23 in FIGURE 1.

Figure 4:
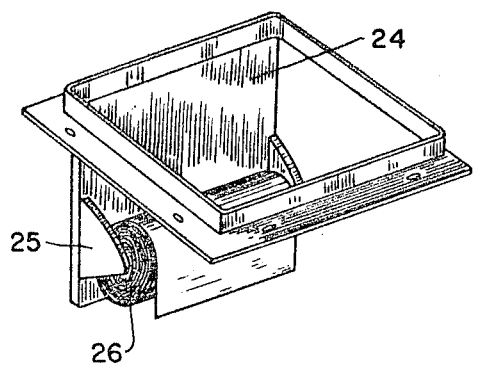
FIGURE 4 is a perspective view of a second form of my device designed for holding a roll of paper toweling.

FIGURE 4 shows a second embodiment of my invention wherein the panel 24 of this form has a pair of opposed arms 25 formed with the panel for rotatably supporting a roll of paper toweling 26 therebetween. In the form shown in the drawing, the arms are formed of the same material as the panel and are formed integral therewith; however, a conventional towel rack may merely be secured to a flat panel, if desired.

In the case of a unit designed for holding a roll of paper toweling, the toweling may be dispensed when the panel 24 is in the open position, as shown in FIGURE 4. It is also understood that toweling may be withdrawn from the roll when the roll is in its stored position through the cupboard door.

While a toaster and a roll of paper toweling are shown in the drawings for exemplification, it is understood that my unit may be designed for holding a variety of appliances for the kitchen. Appliances such as knife racks, spice racks or the like may be secured directly to a flat panel in much the same fashion as a rack for paper toweling would be.

My fold-away appliance support is very simple and inexpensive in construction and can readily be installed by a do-it-yourself type individual in an existing kitchen cupboard. Use of my invention eliminates the cluttering of the kitchen counter top when the particular appliance is not in use and generally improves the appearance and orderliness in the food preparation area.

It is understood that my invention is not confined to the particular constructions or arrangements of parts herein illustrated and described, but embraces all equivalents thereof.

I claim:
1. Apparatus for supporting a kitchen appliance from the bottom of a cupboard, said apparatus comprising:
   (a) a substantially rectangular frame fixedly mounted in a hole formed in the bottom of the cupboard, said frame defining a substantially rectangular opening,
   (b) a substantially flat rigid panel hingedly connected to said frame for swinging movement between a substantially horizontal closed position wherein said panel extends across said opening to support said appliance in a storage position within said cupboard, and a substantially vertical open position below said opening,
   (c) means for releasably holding said panel in said closed position, and
   (d) means fixedly attached to said panel for supporting said appliance in working position below said opening when said panel is in said open position.

2. The apparatus as specified in claim 1 wherein said means fixedly attached to said panel comprises a rigid shelf extending at a right angle from said panel.

3. The apparatus as specified in claim 1 wherein said means fixedly attached to said panel comprises a pair of arms for rotatably supporting a roll of paper toweling therebetween.

4. The apparatus as specified in claim 1 including a gripping handle for opening said panel and for maintaining said panel in a substantially vertical position when said panel is opened.

References Cited
UNITED STATES PATENTS

| | | | |
|---|---|---|---|
| 1,505,355 | 8/1924 | Larsen. | |
| 2,450,233 | 9/1948 | Cummings | 312—248 X |
| 2,551,305 | 5/1951 | Tompkins | 312—328 |
| 2,872,178 | 2/1959 | Holland | 312—242 X |
| 3,071,288 | 1/1963 | Gantner | 221—46 |
| 3,216,606 | 11/1965 | Garner | 312—328 X |
| 3,259,287 | 7/1966 | Spiker | 312—39 X |

CASMIR A. NUNBERG, Primary Examiner

U.S. Cl. X.R.

312—327, 242, 223